May 29, 1962 A. F. HICKMAN 3,036,805
RESILIENT SEAT STRUCTURE
Filed Feb. 14, 1958 6 Sheets-Sheet 1

INVENTOR.
Albert F. Hickman.
BY Popp and Sommer
Attorneys.

May 29, 1962 A. F. HICKMAN 3,036,805
RESILIENT SEAT STRUCTURE
Filed Feb. 14, 1958 6 Sheets-Sheet 2

INVENTOR.
Albert F. Hickman
BY
Popp and Sommer
Attorneys.

May 29, 1962 A. F. HICKMAN 3,036,805
RESILIENT SEAT STRUCTURE
Filed Feb. 14, 1958 6 Sheets-Sheet 3

Fig. 6.

INVENTOR.
Albert F. Hickman
BY
Popp and Sommer
Attorneys.

United States Patent Office 3,036,805
Patented May 29, 1962

3,036,805
RESILIENT SEAT STRUCTURE
Albert F. Hickman, Eden, N.Y., assignor to Bostrom Corporation, Milwaukee, Wis., a corporation of Wisconsin
Filed Feb. 14, 1958, Ser. No. 715,368
17 Claims. (Cl. 248—373)

This invention relates to a seat structure and more particularly to such a seat structure which in one form is designed for use with extremely rough riding vehicles such as farm tractors and military vehicles, and which in another form is designed for use in truck cabs to seat one or more persons, including the driver.

The design of a seat for rough riding off-the-road vehicles, such as farm tractors, presents special problems in order to permit the maximum speed over rough terrain without loss of full control of the vehicle and with maximum riding comfort. Among these problems is the provision of a suspension sturdy enough to withstand the violent impacts in all directions to which the suspension is subjected while at the same time having positive control of the direction of movement of the seat and a resilient resistance of proper frequency to give, within the permitted limits of seat movement, a ride having the maximum comfort. Fore-and-aft tipping or rocking of the seat as well as lateral listing or lurching of the seat must also be avoided to insure the driver remaining in control of the tractor. All of this must be accomplished within limited space conditions.

The design of a seat for a highway truck cab presents special problems not encountered in passenger vehicles. The main springs for trucks are necessarily strong enough to carry heavy loads and therefore when the trucks are only partly loaded, or completely unloaded, the spring frequencies are considerably above 100 cycles per minute which causes a very uncomfortable and fatiguing ride unless the driver and the riders are protected by comfortable and practicable seating equipment. If conventional cushions having soft internal springs are used the bottom cushions are subjected to an excessive amount of action which soon breaks the bottom cushion materials and requires repair and replacement thereof. Further, such excessive action of the bottom cushion is necessarily accompanied by an excessive amount of movement between the back of the occupant and the back cushion. This is very uncomfortable and causes excessive clothing as well as back cushion wear. Also, as with tractor seats, fore-and-aft rocking or lateral lurching of the seat must be prevented and the designer of truck seats is always confronted with severe space limitations.

General objects of the present invention are to provide a seat structure, (1) which provides the maximum safety and comfort and leaves the occupant in full control of all controls of the vehicle; (2) in which the seat moves with the occupant and is not drawn or jerked away from the occupant whenever the pressure imposed by the occupant upon the seat becomes negative; (3) which will operate in a highly desirable frequency range regardless of the weight of the occupant, the condition of the terrain or the weight of the load carried; (4) which can be designed, within practicable limits, to have any desired frequency and any desired resistance curve; (5) in which torsion springs are employed to provide a longer and a variable spring resistance range; (6) in which the resilient support is provided by torsion springs which are simple, compact, low in cost and have long life and freedom from service difficulties; (7) in which the resilient resistance is obtained in a compact structure which requires little servicing and is free from noise; (8) in which the load from the seat part to the suspension means and from the suspension means to its base part is distributed at a plurality of widely spaced points; (9) in which both fore-and-aft and lateral tilting or lurching of the seat is prevented; (10) which is made of a plurality of low-cost and sturdy sub-assemblies which can be easily coupled together; (11) which includes a simple and low-cost shackle structure; (12) which is readily adjusted to suit the weight of the driver and (13) which is extremely compact and sturdy and which will stand up under conditions of severe and constant use with very little servicing.

A specific object of all forms of the present invention is to provide in such a suspension simple crank arms of long effective length and interconnected with one another and with the base and seat parts of the seat structure to prevent tipping of the seat and provide a stable ride.

Another object is to provide such a crank arm supporting structure in which the crank arms provide maximum strength and stability with minimum weight and cost of the parts.

Another specific object of the present invention is to provide such a resilient seat suspension in which the resilient support for each individual seat is provided by a straight torsion bar or bars. Such a torsion bar is a very small diameter spring and hence leans for compactness. Also, such torsion bars are the more durable and low-cost form of spring. Accordingly, by such utilization of a metal torsion bar in providing the resilient support for the seat, a compact, low-cost, and durable spring suspension can be provided.

Another object of the invention is to provide such a seat suspension in which the metal torsion bars are relatively short so that the torsion bar for one individual seat can be accommodated in the space behind or in the seat space alongside the torsion bar seat. The use of a short torsion bar is permitted by employing long crank arms in conjunction with each torsion bar. For example, a one inch diameter torsion bar is eight times as strong as an one-half inch diameter torsion bar, but will twist only one-half as many degrees and hence by providing long crank arms with less angular movement shorter and thicker torsion bars can be advantageously employed.

Another object is to provide such a suspension which reliably supports the seat against side wise or fore-and-aft movement and also sidewise or fore-and-aft tipping or lurching, this being in part provided by the long crank arms which can be widely spaced from each other to provide such lateral stability and also can be made long enough to reach beyond the center of gravity of the seat part of the seat structure.

Another object is to provide such a spring suspension which is light in weight, has little friction and has minimum bearing loading and the parts of which telescope or nest with reference to both the base part and seat part of the seat structure and also with reference to one another so as to provide the maximum vertical seat movement under the particular conditions imposed upon the seat design.

Another object is to provide such a seat structure in which the stress on the torsion bar or bars can be kept low, thereby avoiding all danger of over-stressing the torsion bar and avoiding all danger of breaking.

Another object of the invention is to provide such a torsion bar suspension which has a low frequency, that is, in the order of 65 to 75 cycles per minute, this being achieved by the long crank arms having small angular movement and imposing minimum torque movement upon the torsion bar or bars.

Another object is to provide a seat suspension which can be made competitive in price with standard spring cushions and other seat structures now in use.

Another object is to provide a simple and effective means for resiliently limiting the upward movement of the seat and to provide a simple means for providing the desired initial windup of the springs regardless of whether rubber or metal torsion springs are provided.

Another object is to provide a simple and effective adjustment for the degree of pretensioning or windup of the metal torsion bars to suit the weight of the occupant of the seat part of the seat structure.

Another object of the invention is to provide one form of suspension which includes a very light weight linkage for reliably preventing fore-and-aft tipping movement of the seat part of the seat structure.

Another object of the invention is to provide one form of seat structure in which the seating space along side a seat embodying the present invention, and which accommodates its torsion bar, can have a conventional seat or can be another seat structure made in accordance with the present invention with its torsion bars extending into the space occupied by the first seat structure.

Other objects and advantages of the invention will be apparent from the following description and accompanying drawings in which.

Figure 1:
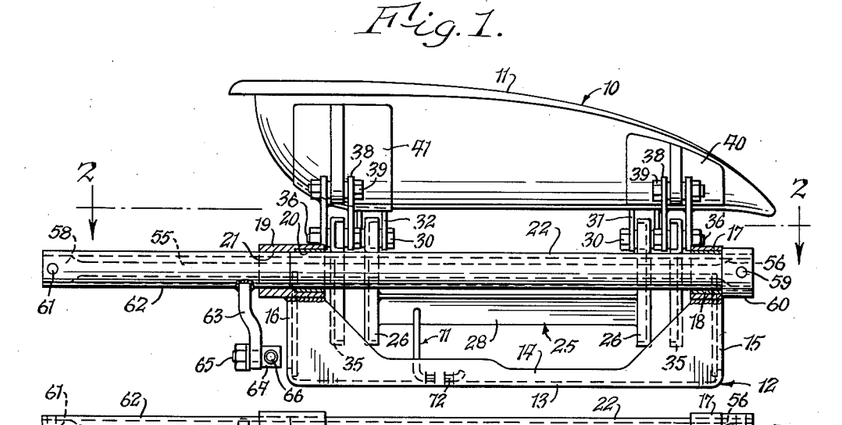
FIG. 1 is a side elevational view, particularly in section, of a tractor seat embodying a form of the present invention in which the resilient resistance is provided by a pair of metal torsion bars.
Figure 2:
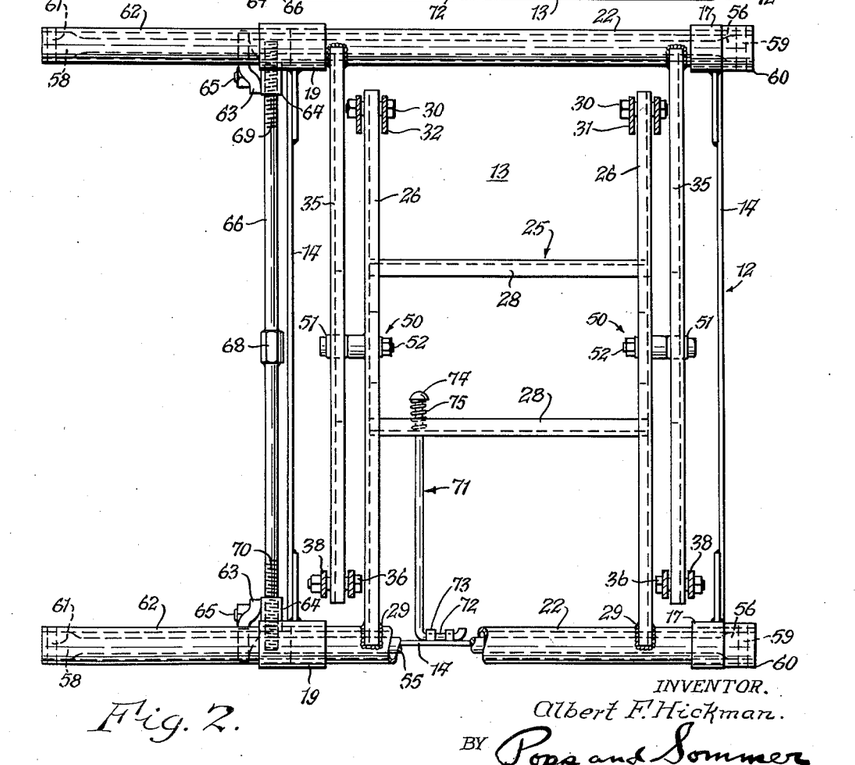
FIG. 2 is a horizontal sectional view taken generally on line 2—2, FIG 1.
Figure 3:
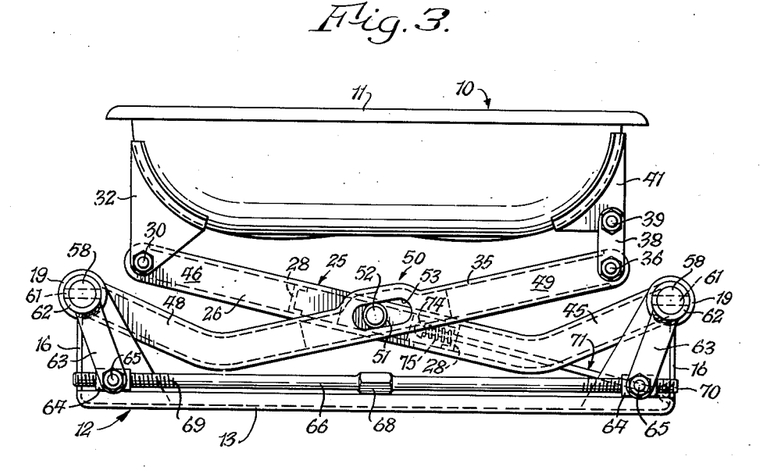
FIG. 3 is a rear elevational view of the seat structure shown in FIGS. 1 and 2.

The form of structure shown in FIGS. 1–3 is designed primarily for use where rough riding or extreme vertical and lateral impact conditions are encountered, such as with farm tractors, railroad locomotives and military vehicles, where lateral and fore-and-aft, as well as vertical stability is required against severe forces, and to this end the seat part 10 of the seat structure is shown as being in the form of a sheet metal bucket type of seat or saddle 11. This seat part 10 is supported on a base part 12 by the spring suspension means embodying the present invention. While this base part 12 can be of any form to suit the particular installation it is shown as being in the form of a horizontal plate 13 of generally rectangular form reinforced by an upstanding marginal flange 14 and having posts rising from each of its four corners, the two front posts being designated at 15 and the two rear posts at 16.

Welded to the top of each of the front corner posts 15 is a cylinder bearing sleeve 17 having its axis extending fore-and-aft and containing a bearing bushing 18 which is preferably composed of sintered metal impregnated with a lubricant. Welded to each of the rear corner posts 16 is a cylinder bearing sleeve 19 containing, in its forward end, a bearing bushing 20 also preferably made of sintered metal impregnated with a lubricant. It will be noted that the bearing sleeves 19 are longer than the bearing sleeves 17 and extend rearwardly from the rear posts 16 to provide cylindrical bearing surfaces 21 at their rear ends.

The front and rear bearing sleeves 17, 19 at each side of the base part 12 are in horizontal, axial alinement with each other and pivotally support the front and rear ends of a horizontal rock shaft in the form of a rock sleeve 22. To one of these rock sleeves is welded an H-frame indicated generally at 25 and comprising a pair of crank arms 26 connected by cross bars 28. These crank arms 26 are arranged in parallel, spaced relation and extend in the same generally horizontal direction to the side of the seat structure opposite from their rock sleeve 22. One end of each crank arm 26 is welded, as indicated at 29, to the corresponding rock sleeve 22 and their other ends are pivotally connected, as indicated by the pivot pins 30, with brackets 31 and 32 suitably secured, respectively, to the front and rear parts of the bucket seat 11 in any suitable manner.

The other rock sleeve 22 has welded thereto a pair of crank arms 35 which extend from their rock sleeve 22 in the same direction to the opposite side of the seat structure, the free end of each of these crank arms 35 being connected by a pivot pin 36 to the lower end of a pair of shackles 38, the axis of the pivot pins 36 being parallel with rock sleeves 22. Each pair of shackles 38 has an upper pivot pin 39, the pivot pin 39 at the front of the bucket seat 11 connecting with a front bracket 40 and the pivot pin 39 at the rear of the bucket seat 11 connecting with a rear bracket 41, both of these brackets 40, 41 being suitably secured to the side of the bucket seat 11 opposite from the rock sleeve 22 carrying the crank arms 35.

It is important to provide the maximum amount of vertical movement of the bucket seat 11 and to this end the bucket seat is cradled or telescopes within the crank arms 26, 35 in the extreme downward position of the bucket seat. For this purpose, as best shown in FIG. 3, each crank arm 26 is in the form of a bent lever having a downwardly extending relatively short fulcrum end 45 and a longer free end 46, which, in the unoccupied position of the seat shown inclines upwardly toward its outer end. Each crank arm 35 is similarly in the form of a bent lever, having a relatively short downwardly extending fulcrum end 48 and having its longer free end 49 extending upwardly in the unoccupied position of the bucket seat 11 shown. It will be seen that in the extreme downward position of the bucket seat 11 it passes below the rock sleeves 22 and hence is cradled between the fulcrum ends 45 and 48 of the crank arms 26 and 35, respectively.

It will be seen that the crank arms 26, 35 are in crisscross relation and an important feature of the invention in preventing tipping of the bucket seat in any direction resides in the provision of a sliding connection 50 between each crank arm 26 and its companion crank arm 35. This sliding connection is shown as being in the form of a roller 51 rotatably mounted on a horizontal pin 52 secured to the central part of each of the crank arms 26. Each roller 51 is closely fitted in a slot 53 provided in the corresponding crank arm 35 and it will be seen that downward movement of one side of the bucket seat 11 is transmitted through the crank arms 26, 35 and rollers 51 to the opposite side of the bucket seat thereby to prevent side tipping or lurching of the seat frame in use. It will also be seen that a downward force impressed on, say, the front of the seat is transmitted through the front crank arms 26, 35 and front roller 51 to the front of the H-frame 25, of which the crank arms 26 form a part, and through this H-frame and the rear crank arms 26, 35 and rear roller 51 to the rear of the bucket seat 11, thereby to prevent any fore-and-aft tipping or lurching of the bucket seat 11 in use.

In the form of the invention illustrated in FIGS. 1–3 the resilient support for the bucket seat is provided by a pair of metal torsion bars 55 each of which is shown as being made of solid metal round in cross section with integral enlarged cylinder heads 56 and 58 at its front and rear ends, respectively although these torsion bars may be of any suitable form. Each torsion bar 55 has its front end housed within the corresponding rock sleeve 22 and its forward head 56 is pinned in the forward end of its rock sleeve 22 by a cross pin 59. This cross pin 59 can also secure an abutment sleeve 60 on the forward end of the companion rock sleeve 22, these abutment sleeves bearing against the ends of the forward bearing sleeves 17.

The rear end head 58 of each torsion rod 55 is pinned, as indicated by the cross pin 61, to the rear end of a tube 62 which extends forwardly into the bearing sleeve 19 and is journalled in the bore or bearing surface 21 thereof. Adjacent this bearing surface each sleeve 62 has welded thereto a depending adjusting arm 63 the lower end of which pivotally carries a nut 64. For this purpose each nut is provided with a stem 65 which serves as a pivot pin journalled in the corresponding depending arm 63. An adjusting rod 66 is provided at its center with an out-of-round or hex portion 68 permitting the application of a wrench or pliers to turn this rod, and its opposite ends are reversely threaded, that is, provided with right and left hand threads 69 and 70 which fit the respective nuts 64. It will be seen that turning the threaded rod 66, through the adjusting arms 63, sleeves 62 and cross pins 61 turns the anchored or "dead" end of the two torsion rods 55 so as to adjust the degree of windup.

For this purpose means are provided for limiting the upward movement of the seat. As shown these limiting means comprise a rod 71 having one end 72 arranged at right angles to its shank and journalled in a pair of eyes 73 struck inwardly from the marginal flange 14 at that side of the base part 12 arranged under the fulcrum axis of the H-frame 25. The other end of this rod extends through a hole in the nearer cross bar 28 of this H-frame and has a head 74 beyond this cross bar. A helical compression spring 75 is shown as interposed between this head 74 and cross bar 28 so as to cushion the action of the head 74 in stopping and limiting upward movement of the seat.

Figure 5:
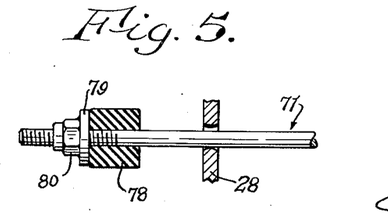
FIG. 5 is an enlarged sectional view taken along the stop rod which limits the upward movement of the seat part of the seat structure and showing a modified form of the resilient bumper provided on this rod.

Instead of the helical compression spring 75 a block of rubber 78 can be employed as shown in FIG. 5. This block of rubber is shown as vulcanized to a washer 79 which in turn is shown as welded to a nut 80. This nut preferably is of the self setting type, that is, internally provided with means to prevent its turning due to vibration or the like.

Assuming the unloaded position of the seat structure illustrated in FIGS. 1–3, in the operation of the suspension the weight of the occupant will depress the seat pan 11 to a lower position and thereafter the upward movement of the tractor, through the base plate 13 and corner posts 15, 16, moves the fulcrumed ends of the crank arms 26 of the H-frame 25 and the crank arms 35 upwardly. Since the movement of the free ends of these crank arms is resisted by the weight of the occupant, this upward movement of the fulcrumed ends of these crank arms 26 and 35 causes the fulcrum rock sleeves 22 of these crank arms to rotate in their bearings 18, 20.

The oscillation of the two rock sleeves 22 for these pairs of crank arms 26, 35 is resisted by the metal torsion bars 55 the force imposed on the forward ends of these torsion bars being transmitted through the rear cross pins 61 to the sleeves 62. The depending arms 63 fixed to these sleeves are connected together by the turnbuckle screw 66 and hence these sleeves are incapable of turning. Accordingly, the movement of the rock sleeves 22 transmitted through the pins 59 to the forward ends of the torsion bars 55 serves to twist these torsion bars, one being twisted clockwise when the other is twisted counterclockwise.

For heavier drivers it is desirable to have a greater degree of windup in the torsion bars 55 and to provide such windup the user turns the out-of-round or hex center 68 of the adjusting screw 66. This screw acts in the manner of a turnbuckle to move the arms 63 toward or from each other and thereby to increase or decrease the pretensioning or windup of the torsion bars 55. In this connection the upward movement of the seat is limited by the helical stop spring 75 or rubber block 78 on the end of the adjusting rod 71, the force of pretensioning of the torsion bars 55 being exerted against this spring 75 or rubber block 78.

Lateral tipping of the bucket seat 11 is prevented by the rollers 51 which pivotally connect the crossing parts of the crank arms 26 and 35 so as to cause them to rise and fall in unison. Since the fulcrumed ends of these crank arms rotate about the fixed axes of the rock sleeves 22, the rollers 51 ride in slots 53 to permit upward and downward movement of the crank arms 26 and 35. Since the pair of crank arms 35 is rigidly connected by a rock sleeve 22 and since the pair of crank arms 26 is also rigidly connected by a rock sleeve 22, it will be seen that the forward tipping or lurching of the bucket seat 11 is prevented. It will also be seen that the cross bars 28 render the crank arms 26 more effective in this regard.

Figure 4:
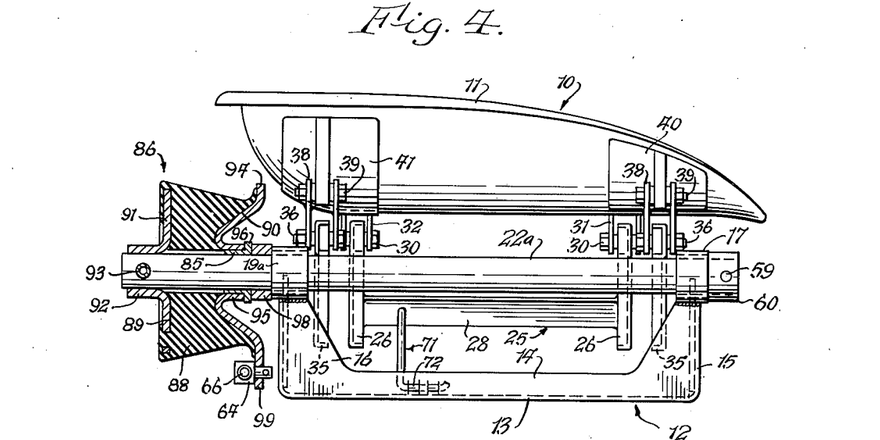
FIG. 4 is a view similar to FIG. 1 showing the manner in which rubber torsion springs can be used in lieu of the metal torsion bars shown in FIGS. 1–3.

It will be seen that the invention is also adaptable to the use of rubber torsion springs instead of the metal torsion bars shown. This modification is shown in FIG. 4 in which the rear pair of bearing sleeves 19a are made somewhat shorter than the corresponding bearing sleeves 19 and the rear ends of the rock sleeves 22a journalled in these sleeves project rearwardly therefrom. The projecting end of each rock sleeve 22a projects through the bearing 85 of a rubber torsion spring indicated generally at 86. Each of these rubber torsion springs can be of any suitable construction and is shown as comprising a generally frusto-conical body 88 of rubber having a flat rear face 89 and a concave forward face 90. To the rear flat face 89 of each rubber body is vulcanized a metal disk 91 having a hub 92 which fits the rear extremity of the corresponding rock sleeve 22a and can be secured thereto in any suitable manner as by a cross pin 93.

To the opposite concave face 90 of each rubber body is vulcanized a conforming convex metal anchoring member or plate 94, this anchoring plate having a cylinder hub 95 in which the bearing bushing 85 is press fitted. It will also be noted that this bearing bushing 85 has an outwardly extending flange 96 at its forward end which bears against the rear end of a thrust ring 98, the forward end of this thrust ring bearing against the corresponding bearing sleeve 19a. A downward extension 99 of the anchoring plate 94 pivotally carries a nut 64, these nuts being connected by a double ended screw 66 in the same manner as in the form of the invention shown in FIGS. 1–3. Since in other respects the form of the invention shown in FIG. 4 is identical with that shown in FIGS. 1–3, the same reference numerals have been employed and the description will not be repeated.

It will be seen that the action of the form of the invention shown in FIG. 4 is the same as that shown in FIGS. 1–3 the only essential difference being that the resilient resistance is provided by a pair of rubber torsion springs 86 instead of by the metal torsion bars 55 as in the form of the invention shown in FIGS. 1-3.

The form of resilient seat suspension illustrated in FIGS. 6-10 is designed for use by the driver of a highway truck and is shown as having a base part or subframe indicated generally at 110 and comprising parallel front and rear bars 111 and 112 and side bars 113 and 114 all of which can be of L-shaped form in cross section, as shown, and welded at their ends to provide the rear subframe bar 112. The two end bars 113, 114 can be severally supported on rails 118 and any conventional mechanism (not shown) can be provided for adjustably positioning the base part or subframe 110 fore-and-aft along these rails 118 to suit the leg length of the driver.

In the form of the invention shown in FIGS. 6-10 the seat part or seat frame 120 for the driver is mounted on a spring suspension embodying the present invention whereas the passenger seat part or frame 121 alongside the driver's seat 120 is of more or less standard construction in that it is merely provided with conventional seat cushions.

The passenger seat 121 is shown as supported by a pair of fore-and-aft bolsters in the form of sheet metal plates 122 having horizontal flanges along their upper and lower edges. These are secured, as by bolts 123, to the front and rear bars 111, 112 of the subframe. These side plates 122 are also preferably interconnected by a cross plate 124. On these plates 122, 124 is mounted a seat frame 125 which can be constructed in any suitable form and as shown is composed of side angle irons connected by transverse angle irons all welded together. This seat frame 125 supports a seat cushion 126 which can be of any suitable form. A triangular plate 128 is shown as secured to the side bars of the seat frame 125 to extend upwardly from the rear part thereto on opposite sides of the seat cushion 126. Each of these triangular plates 128 is shown as carrying an L-shaped bracket 129 which extends around the back of a sheet metal back panel 130. This sheet metal back panel 130 supports a back cushion 131 which can be of any conventional form.

It will be seen that the passenger seat 121, as above described, is of generally conventional form and any degree of springiness is provided by the seat cushion 126 and back cushion 131.

The driver's seat 120 is supported by a torsion bar spring suspension embodying the present invention. For this purpose, a bearing bracket, indicated generally at 135, is suitably secured, as by a bolt 136 to the upper face of the channel bar 116 which projects rearwardly from the center of the base frame 110. This bearing bracket 135 is shown as composed of a base plate 138, side plates 139 and 140 and a back plate 141, these plates being suitably welded together and the back plate 141 connecting the rear edges of the side and bottom plates. The side plate 139 is provided with a lower circular opening in which a bearing sleeve 142 is welded and which contains a bearing bushing 143. The latter can be made of sintered metal impregnated with a lubricant so as to be free from servicing requirements.

Figures 11, 12, 13:
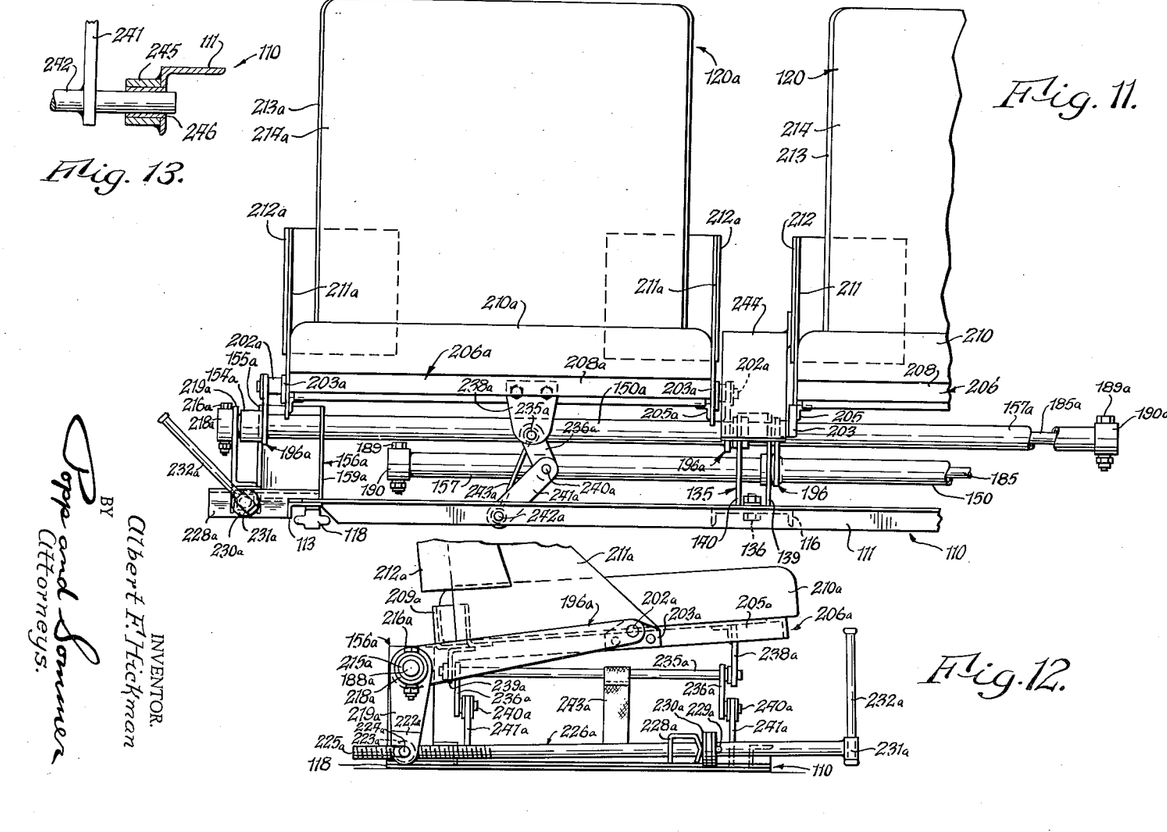
FIG. 11 is a front elevational view, similar to FIG. 1, but showing both of the two seat frames supported by resilient torsion bar suspensions embodying the present invention.
FIG. 12 is an end view, viewed from the left hand end of FIG. 11.
FIG. 13 is an enlarged fragmentary vertical section taken on line 13—13, FIG. 9.

The axis of the bearing sleeve 142 is parallel with the front and rear bars 111, 112 of the base frame and in line with this bearing sleeve an opening 144 is provided in the side plate 140 of the bracket 135. Above this opening the side plate 140 is provided with another circular opening in which a bearing sleeve 142a is welded, this sleeve also containing a bearing bushing 143a preferably made of a sintered metal impregnated with a lubricant. This bearing sleeve 142a is parallel with the bearing sleeve 142 and alines with a circular opening 144a in the side plate 139. The bearing bushing 143a and opening 144a are only used if the passenger seat is also supported by a torsion bar suspension seat structure made in accordance with the present invention. Such an arrangement is shown in FIGS. 11 and 12 where the torsion bar passenger seat is designated at 120a. Since in FIGS. 6-10 the passenger seat 121 is a conventional seat and not supported by a torsion bar, the bearing bushing 143a and hole 144a are not used. If, however, the truck owner should desire to have a torsion bar suspension seat 120a for the passenger as well as the driver, he can remove the conventional passenger seat 121 shown and substitute the torsion bar suspension seat 120a hereinafter described.

The rock sleeve 150 is also journaled within a bearing bushing 153 contained within a bearing sleeve 154, the latter being welded within an opening provided in the side plate 155 of a bracket 156. This bracket is of U-shaped form in horizontal section, having a back plate 158 and another side plate 159, the latter being provided with a hole 160 through which the rock sleeve 150 extends. The bracket 156 is welded at its base to the rearward extension of the side bar 114 of the base or subframe 110.

The corresponding end 157 of the rock sleeve 150 projects beyond the bearing sleeve 142 to a point close to the side bar 113 of the base or subframe 110, this rock sleeve thereby extending substantially the full transverse extent of the base or subframe 110. This rock sleeve houses a metal torsion bar 185 which is slightly longer than this rock sleeve and has enlarged cylindrical heads 186 and 188 at its opposite ends. The head 186 is fitted within the outboard end 157 of the rock sleeve 151 and secured thereto by a cross pin 189 in the form of a bolt. This bolt 189 also extends through and secures a cylindrical collar 190 to the exterior of the rock sleeve 150, the purpose of this collar being to provide additional wall thickness to the rock sleeve 150 at this point, the entire rotative force of the rock sleeve 150 being transmitted to the torsion bar 185 at this point.

A pair of crank arms 195, 196 are welded to the rock sleeve 150 and project horizontally forwardly therefrom. The crank arm 196 is in the form of a flat straight bar welded to the rock sleeve 150 but the crank arm 195 is shown as being in the form of an L-shaped flat metal bar having its fulcrum end 197 extending vertically upwardly to embrace the rock sleeve 150 to which it is welded. The crank arm 196 can be straight because it is outside of the seat frame 206 whereas the crank arm 195 is below the seat frame and must be bent to clear the rear rail 209 of the seat frame 206 when the seat frame telescopes downwardly. The free end 199 of the bent crank arm 196 in the unloaded position of the seat 120 as shown, extends upwardly and forwardly from the lower part of the fulcrum end 197. The crank arms 195, 196 are arranged between the bearing sleeves 142, 154 with a thrust bearing 200, also preferably of a sintered metal impregnated with lubricant, interposed between the bearing sleeve 142 and the adjacent crank arm 196, and the other crank arm 195 preferably being in thrust engagement with the bearing sleeve 154. It will be seen that the crank arms 195, 196 prevent endwise displacement of the rock sleeve 150 and also serve as thrust bearings against any thrust forces exerted by the rock sleeve 150. It will also be seen that the rock sleeve 150 and its crank arms 195, 196 form a U-shaped yoke.

A pivot pin 202 connects the forward or free end of each crank arm 195, 196 with a bracket 203. These brackets are preferably welded to and project downwardly from the side rails 204, 205 of a horizontal seat frame 206. These side rails are connected by front and rear rails 208 and 209, the latter extending upwardly to embrace the rear of a seat cushion 210 mounted on the seat frame 206. To each of the side rails 204, 205 is secured a vertical plate 211 which extends upwardly from the rear end thereof and which carries a bracket 212 which is L-shaped in cross section, the rear parts of these brackets being secured to the metal back panel 213 which supports a back cushion 214.

It will be seen that vertical movement of the seat frame 206 is transmitted through the crank arms 195, 196 to the rock sleeve 150 and from this rock sleeve to the end head 186 of the torsion bar 185.

Figures 9, 10:
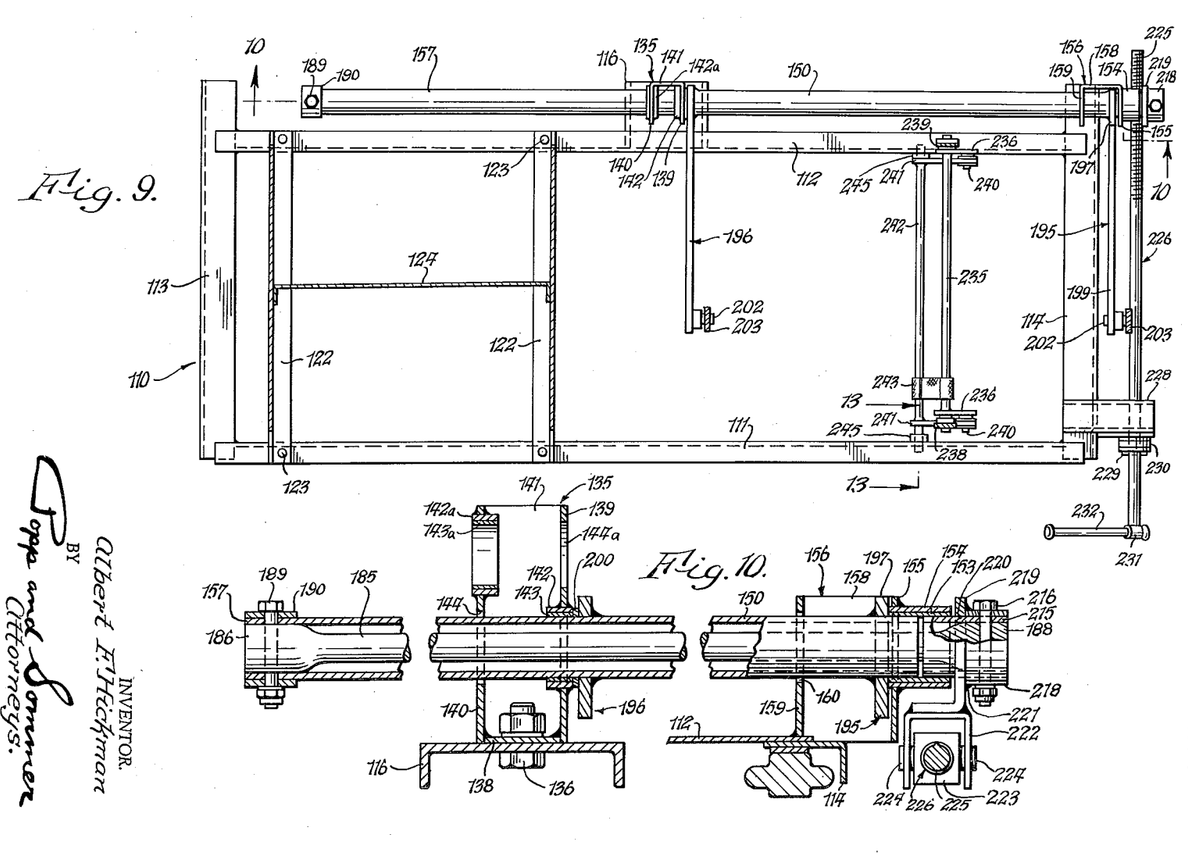
FIG. 9 is a horizontal sectional view taken generally on line 9—9, FIG. 8.
FIG. 10 is a fragmentary enlarged vertical section taken generally on line 10—10, FIG. 9.

The end head 188 at the opposite end of the torsion bar 185 projects out from the other end of the rock sleeve 150 into a sleeve 215 which is also journaled in the bearing bushing 153 as illustrated in FIG. 10. The torsion bar end head 188 is secured to this sleeve 215 by a cross pin in the form of a bolt 216 which also extends through a collar 218 fitted around the sleeve 215. The purpose of this collar 218 is to increase the effective wall thickness of the sleeve 215 at the place through which the cross pin 216 extends.

The vertical part of an L-shaped bracket 219 is provided with a circular opening 220 and is fitted over the sleeve 215 between the bearing sleeve 154 and the collar 218. This bracket 219 is welded to the collar 218 as indicated at 221 and its lower horizontal part is welded to the cross part of a U-shaped yoke 222 the legs of which project downwardly and pivotally support a nut 223 the threaded bore of which extends fore-and-aft and the trunnions of which are indicated at 224. In this threaded bore is screwed the threaded end 225 of an adjusting shaft 226. This adjusting shaft extends forwardly and has its forward end journaled in a bracket 228 which is welded to the corresponding side rail 114 to project horizontally outwardly therefrom. In front of the base bracket 228 a cross pin 229 extends through the shaft 226.

A thrust bearing 230 of any suitable form is interposed between this cross pin 229 and the base bracket 228. Any suitable means, such as a cross sleeve 231 at the outboard end of the shaft 226 and containing a sliding handlebar 232 can be provided for turning the shaft 226. The purpose of so turning this shaft is to adjust the degree of pretensioning or windup of the torsion rod 185 as hereinafter described.

Figure 6:
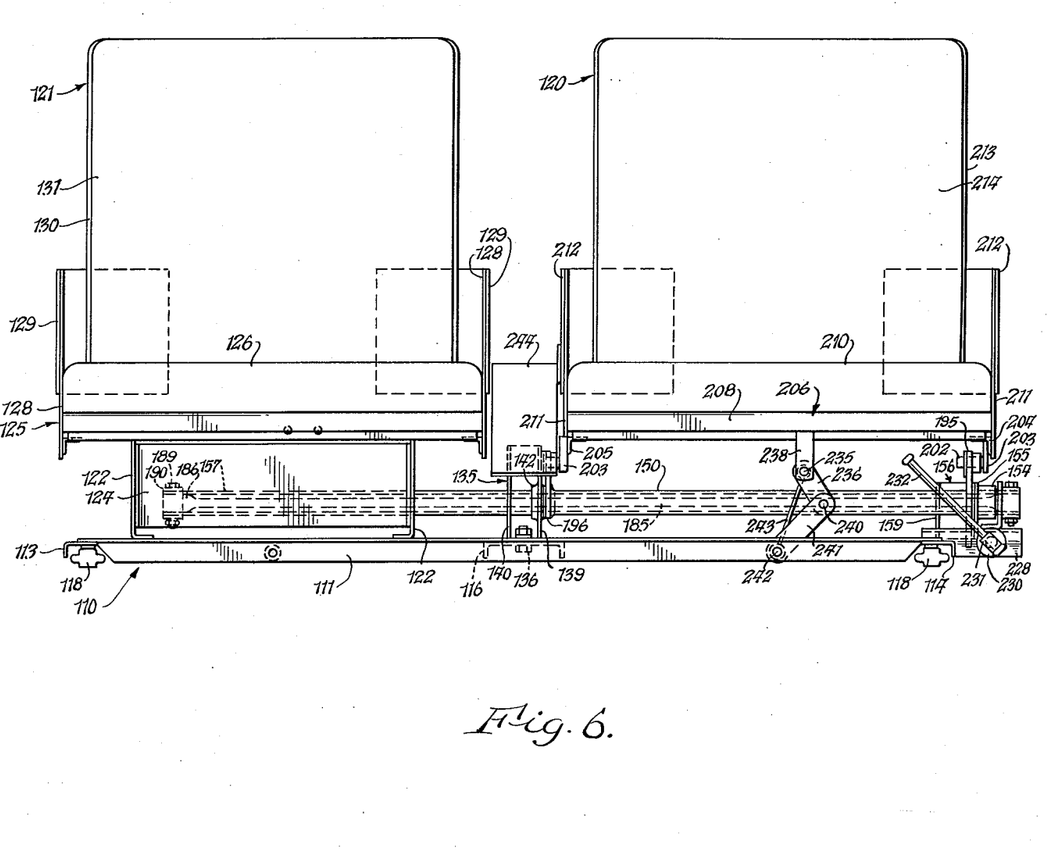
FIG. 6 is a front elevational view of a dual occupancy highway truck seat with one of the seat frames supported by a metal torsion bar spring suspension embodying the present invention and the other seat being merely provided with a conventional spring loaded seat and back cushion.
Figure 7:
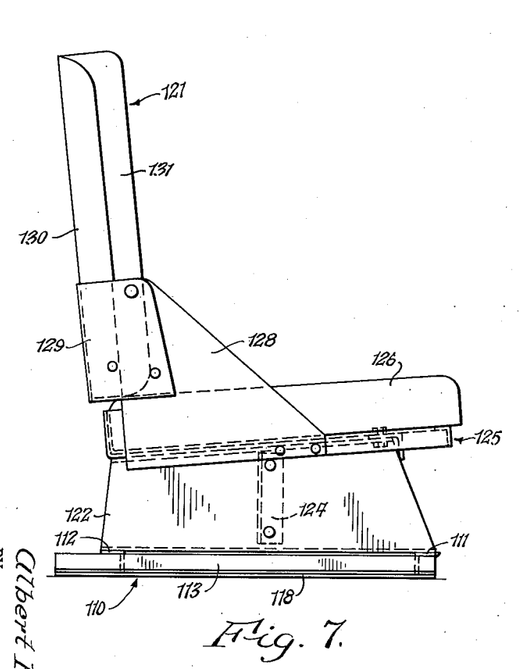
FIG. 7 is a side elevational view thereof viewed from the left hand side of FIG. 6 and showing the seat frame provided merely with conventional seat and back cushions.
Figure 8:
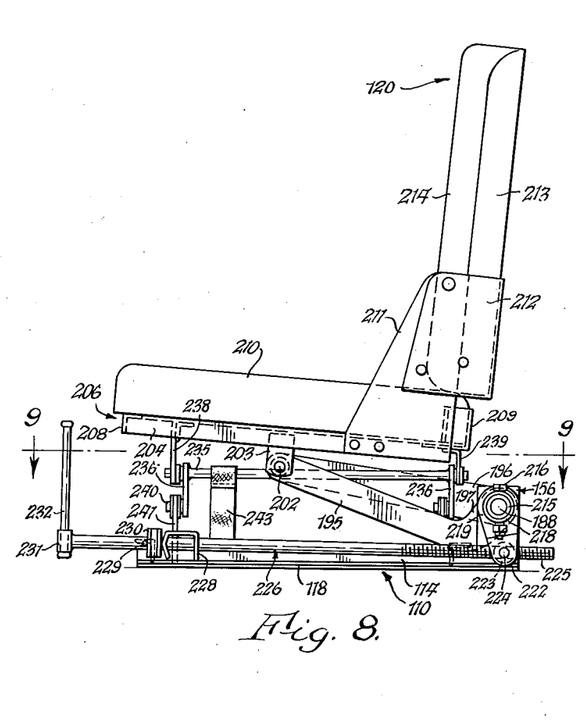
FIG. 8 is a side elevational view, viewed from the right of FIG. 6 and showing the seat frame which is supported by the torsion bar spring suspension forming the subject of the present invention.

The U-shaped yoke formed by the rock sleeve 150 and the crank arms 195, 196 effectively prevent sidewise tipping or listing of the seat frame. Thus a vertical force on one side of the seat cushion 210 is transmitted through the adjacent crank arm, say 196, rock sleeve 150 and opposite crank arm 195 to the opposite side of the seat cushion so that both sides of the seat cushion are compelled to rise and fall in unison and the seat frame cannot tip sidewise in use. This does not, however, prevent fore-and-aft tipping of the seat frame which is also highly undesirable in changing the driver's position with reference to the various control pedals of the vehicle. To prevent such fore-and-aft tipping of the seat frame a light linkage is provided which is preferably constructed as follows:

The numeral 235 represents a rock shaft extending horizontally fore-and-aft under the seat frame 206 and the seat cushion 210. Crank arms 236 are welded to the opposite ends of this rock shaft and in the elevated position of the seat part of the seat structure extend downwardly at an oblique angle to the vertical as illustrated in FIG. 6. The front end of the rock shaft 235 is suitably journaled in a bracket 238 which is fixed to and projects downwardly from the seat frame 206. The rear end of this rock shaft is journaled in a bracket 239 which likewise is fixed to and projects downwardly from this seat frame 206. Each crank arm 236 is provided with a crank pin 240 which connects with the upper end of a crank arm 241, the two crank arms 241 being fixed to a rock shaft 242. The opposite ends of the rock shaft 242 are suitably journaled in the front and rear cross bars 111, 112 of the base or subframe 110. It will be seen that any vertical force against, say, the front of the seat frame 206 is transmitted through the front crank arms 236, 241 and rock shafts 235, 242 and rear crank arms 236, 241 to the rear end of the seat frame thereby to compel the front and rear ends of the seat frame to rise and fall in unison.

It is important that the crank arms 236, 241 do not open up beyond about the angle shown in FIG. 6 since otherwise they might offer resistance to the free vertical movement of the seat frame 206. It is also important that the upper movement of the seat frame 206 be resiliently limited in order that the torsion bar 185 can be pretensioned by adjustment of the handle 232. Any suitable stop can be provided for this purpose, there being shown a flexible strap 243 having one end embracing the upper rock shaft 235 and its other end embracing the lower rock shaft 242 and this strap, in the unoccupied condition of the seat, being under tension and limiting the maximum elevation thereof.

The mechanism between the driver's and passenger's seats 120, 121 can be protected by a sheet metal hood or cover 244.

The forward ends of the crank arms 195, 196 swing through vertical areas about their fixed fulcrum axis and hence provision must be made for a slight fore-and-aft movement of the seat part 206. This is preferably accomplished by making the rock shaft 242 longitudinally slidable as well as rotatable in its bearings. Thus the bearing sleeves 245 for opposite ends of this rock shaft are preferably spaced further apart than the rock arms 241 and are lined with cylindrical bearing bushings 246 as shown in FIG. 13 so that this rock shaft can slide, while rotating, to permit the required fore-and-aft movement of the seat frame 206 by the swinging crank arms 195, 196.

In the operation of the dual occupancy seat as shown in FIGS. 6–10, the passenger seat 121 is of conventional form and action, the only resiliency being that provided by springs or yielding material in the seat cushion 126 and back cushion 131, the passenger seat frame 125 being solidly supported by the sheet metal understructure on the chassis of the automobile.

As to the driver's seat 121, downward movement of the seat frame 206 relative to the base or subframe 110 causes a downward swinging movement of each of the crank arms 195, 196, these crank arms rotating the rock sleeve 150 about its axis. This rock sleeve is journaled in the bearing bushings 143, 153 of the bearing sleeves 142, 154 carried by the base or subframe 110 and this oscillation of this rock sleeve 150 is transmitted to the live end 186 of the solid torsion bar 185 through the cross pin 189. Since the dead end 188 of this torsion bar 185 is anchored, through the cross pin 126 and sleeve 215 in the bracket 219, this downward movement of the seat part 206 is resisted by the twisting of the torsion bar 185 which provides the resilient support for the seat frame and returns it to its elevated position. This elevated position is determined by the length of the flexible strap 243 which determines the separation of the rock shafts 235 and 242 journaled on the seat part and base part, respectively.

It will be noted that the two crank arms 195, 196 are welded to the rock sleeve 150 and are arranged at opposite sides of the seat 120 so that these parts form a large and rigid U-shaped yoke which prevents sidewise listing of the seat during its action. Thus, a downward force impressed on one side of the seat part 206 is transmitted through the adjacent crank arm, say the crank arm 195 and rock sleeve 150 to the opposite crank arm 196 which operates to pull down the opposite side of the seat part 206 to prevent any sidewise listing of the seat part 206.

It will also be noted that fore-and-aft tipping or rocking of the seat part 206 is prevented by the U-shaped yokes comprising the two fore-and-aft rock shafts 235, 242 and their crank arms. Thus a downward force on, say, the front part of the seat frame 206 is transmitted through the front crank arms 236, 241 to the rock shafts 235, 242 to which they are welded. These rock shafts in turn transmit this movement through their rear crank arms 236, 241 to the rear part of the seat frame to draw this rear part of the seat part down and thereby compel the front and rear parts of the seat frame to rise and fall in unison. Any fore-and-aft rocking or lateral lurching or listing is highly undesirable in a driver's seat since it is not only uncomfortable but changes the relation of the driver to his controls.

Heavier drivers require increased pretensioning or wind-up of torsion bar 185. This is accomplished by turning the sliding handle 232 thereby to turn the adjusting screw 226. This screw is held against longitudinal movement by the thrust bearing 230 against the fixed bracket 228. Accordingly, turning this shaft 226, moves the nut 223 in a corresponding direction thereby to swing the bracket 219 and the collar 218 welded thereto. Through the cross pin or bolt 216, this turns the dead or anchored end of the torsion bar 185 angularly thereby to provide the required amount of pretensioning.

The entire base part or frame 110 can be adjusted forwardly or rearwardly along the rails 118 to suit the leg length of the driver, the mechanism for this purpose being conventional and not being shown.

It will be noted that a feature of the invention resides in the extension bar 185 alongside or into the adjacent seating space for the passenger. At the same time it is possible to make this torsion bar of relatively large diameter because of the long crank arms 195, 196 which actuate this torsion bar. Thus these long crank arm 195, 196 have a relatively small angular movement for a given vertical movement of the seat part 206 and thereby impart a relatively small angular movement to the torsion bar 185. With such reduced angular movement the torsion bar can be made shorter and thicker and at the same time have the desired response. It will be appreciated that the length of a torsion bar constitutes the major problem in designing a practicable seat suspended on such a torsion bar or bars.

It will also be noted that the rock sleeve 150 serves a number of different purposes. Thus, as previously explained it serves as the rigid cross part of a U-shaped yoke the arms of which are the crank arms 195 and 196 and this yoke serving to transmit vertical motion from one side of the seat frame 206 to the opposite side of the seat frame thereby to prevent sidewise rocking or listing of this seat frame. It also serves as the journal for these crank arms, being directly journaled in the bearing bushings 143, 153. It also serves to house the torsion bars 185 and has the further function of transmitting motion of the crank arms 195, 196 to the remote live end 186 of the torsion bar 185 and which live end is arranged at the far side of the passenger seating space. It also forms a part of a low cost assembly providing a seat suspension in which the resilient resistance is provided with a simple torsion bar.

If desired, in place of the conventional seat 121 for the passenger, as shown in FIGS. 6–10, the passenger seat can be supported on a suspension substantially identical with the driver's seat 120. The parts of this torsion bar passenger seat, designated at 120a, are substantially the same as the parts of the torsion bar driver's seat 120 and hence the same reference numerals have been employed but have been distinguished by the suffix "a." Slight differences in positioning of the parts are required to provide a right hand adjustment for the passenger and to project the torsion bar 185a and rock sleeve 150a alongside the driver's space. Thus, it will be noted that the torsion bar 185a and its rock sleeve 150a are arranged above and hence higher than the torsion bar 185 and its rock sleeve 150. Accordingly, the bearing bracket 156a is higher than the bearing bracket 156. It will be noted that the other bearing bracket 135 is common to both of the rock sleeves 150, 150a, the rock sleeve 150a using the bearing bushing 143a and hole 144a previously described. It will also be noted that the passenger seat frame 206a is supported by two straight main crank arms 196a, it being unnecessary to provide one of these in the form of an L-shaped crank arm, as with the crank arm 195, because both of the crank arms 196a are arranged outside of the seat frame 206a. Since except for such minor details the construction and operation of the passenger seat 120a is identical with the driver's seat 120, a detailed description of the construction and operation of this passenger seat 120a is not repeated.

From the foregoing it will be seen that the present invention provides a simple torsion spring seat suspension which can be used both for rough riding off-the-road vehicles such as farm tractors and also for highway trucks which are subject to large load variations. It will also be seen that while rubber torsion springs can be provided a feature of the invention resides in the use of low cost metal torsion bars. It will also be seen that an important feature of the invention resides in the placing of these metal torsion bars so as not to interfere with other parts and also by reducing their length through the use of long lever arms in actuating these torsion bars. It will further be seen that all forms of the invention are rugged and free from service difficulties and at the same time are very low in cost so as to be competitive with other seats now being used for such purposes.

I claim:

1. A spring suspension for resiliently supporting a seat part upon a base part, comprising a rock sleeve journaled on one of said parts to rotate about a generally horizontal axis, a pair of generally parallel crank arms fast to said rock sleeve and projecting generally horizontally in the same direction therefrom, means pivotally connecting the outer ends of said crank arms to the other of said parts, a metal torsion bar arranged in said rock sleeve and having one end fast thereto, the other end of said torsion bar projecting outwardly beyond the other end of said rock sleeve, a coaxial collar fast to said other end of said torsion rod and journaled in said one of said parts, and means adjustably anchoring said collar in different angular positions in relation to said one of said parts.

2. A spring suspension for resiliently supporting a seat part upon a base part, comprising a pair of spaced bearings on one of said parts having a common generally horizontal axis, a rock sleeve journaled in said bearings, a pair of generally parallel crank arms fast to said rock sleeve and projecting generally horizontally in the same direction therefrom, means pivotally connecting the outer ends of said crank arms to the other of said parts, a a tubular collar fitted over one end of said rock sleeve, a metal torsion bar arranged in said rock sleeve and having one end arranged in said tubular collar, a cross pin through said tubular collar, rock sleeve and one end of said torsion bar and compelling them to rotate together, the other end of said torsion bar projecting outwardly beyond the other end of said rock sleeve, a coaxial adjusting collar fast to the other end of said torsion bar, said last sleeve being journaled in one of said bearings, and means arranged adjacent said last bearing and adjustably anchoring said adjusting collar in different angular positions therein.

3. A spring suspension for resiliently supporting a seat part upon a base part, comprising a pair of generally parallel rock sleeves at opposite sides of said seat part and journaled on one of said parts to rotate about generally horizontal axes, a pair of generally parallel crank arms fast to each rock sleeve and projecting generally horizontally in the same direction therefrom, the crank arms of one rock sleeve projecting in the generally opposite direction from the other pair of crank arms, means pivotally connecting the outer ends of said pairs of crank arms to the other of said parts, a metal torsion bar arranged in each rock sleeve and having one end fast thereto, the other end of each torsion bar projecting beyond the other end of its rock sleeve, a coaxial adjusting sleeve fast to said other end of each torsion rod and journaled in said one of said parts, an adjusting arm fixed to project in a generally vertical direction from each of said adjusting sleeves, and screw means interconnecting said adjusting arms to rotate them in unison to different angular positions.

4. A spring suspension for resiliently supporting a seat part upon a base part, comprising a pair of generally parallel horizontally elongated rock shafts severally journaled on one of said parts to each rotate about a longitudinal generally horizontal fulcrum axis which is fixed with reference to said one of said parts, said rock shafts being arranged at opposite sides of the spring suspension with their axes generally parallel, a pair of generally parallel rock arms fixed to opposite ends of each rock shaft and each pair projecting generally horizontally in the same direction to a position adjacent the side of the spring suspension opposite their rock shaft whereby said rock arms are in criss-cross relation to one another, means pivotally connecting the outer ends of both pairs of rock arms to the other of said parts on axes generally parallel with the axes of said rock shafts, and means arranged to resiliently resist movement of said seat part toward said base part.

5. A spring suspension as set forth in claim 4 wherein means connect the one pair of rock arms to the other pair of rock arms to compel them to rise and fall in unison.

6. A spring suspension as set forth in claim 4 wherein a longitudinal track is provided on at least one of said rock arms and wherein a member is mounted on the companion rock arm to ride along said track and compel said rock arms to rise and fall in unison.

7. A spring suspension as set forth in claim 4 wherein each rock arm of one pair is provided with a longitudinal slot and wherein a roller is mounted on each rock arm of the other pair to ride along the corresponding slot and compel said rock arms to rise and fall in unison.

8. A spring suspension as set forth in claim 4 wherein one pair of said rock arms is arranged between the other pair and wherein a cross bar rigidly interconnects said one pair of said rock arms intermediate their ends.

9. A spring suspension as set forth in claim 8 wherein a rod is pivotally mounted on the said one of said parts on which said rock shafts are fulcrumed and projects through an opening provided in said cross bar, and wherein a resilient stop is provided at the projecting extremity of said rod to engage said cross bar and limit upward movement of said seat part.

10. A spring suspension as set forth in claim 4 wherein said rock shafts are in the form of rock sleeves and wherein said means arranged to resiliently resist movement of said seat part are metal torsion bars each having one end arranged in and fixed to a corresponding rock sleeve, and means interconnecting the opposite ends of said torsion bars to resist turning thereof.

11. A spring suspension for resiliently supporting a seat part upon a base part, comprising a rock sleeve journaled on one of said parts to rotate about a generally horizontal axis, said rock sleeve having one end projecting a substantial distance beyond said seat part, a pair of generally parallel crank arms fast to said rock sleeve and projecting generally horizontally in the same direction, means pivotally connecting the outer ends of said crank arms to the part opposite the part to which said rock sleeve is journaled, a metal torsion bar having one end arranged in and fixed to the projecting end of said torsion sleeve, means anchoring the other end of said torsion bar against rotation, and means additionally supporting said seat part, comprising a U-shaped yoke having a cross part journaled at spaced points on one of said parts along a generally horizontal axis extending transversely of said rock sleeve and a link pivotally connecting the free end of each arm of said U-shaped yoke with the other of said parts.

12. A spring suspension for resiliently supporting a seat part upon a base part, comprising a rock sleeve journaled on one of said parts to rotate about a generally horizontal axis, said rock sleeve having one end projecting a substantial distance beyond said seat part, a pair of generally parallel crank arms fast to said rock sleeve and projecting generally horizontally in the same direction, means pivotally connecting the outer ends of said crank arms to the part opposite the part to which said rock sleeve is journaled, a metal torsion bar having one end arranged in and fixed to the projecting end of said torsion sleeve, means anchoring the other end of said torsion bar against rotation, and means additionally supporting said seat part, comprising a pair of U-shaped yokes each having its cross part journaled at spaced points on a corresponding one of said parts along a generally horizontal axis extending transversely of said rock sleeve, and means pivotally connecting the free end of each arm of one U-shaped yoke to the free end of a corresponding arm of the other yoke.

13. A spring suspension for resiliently supporting a seat part upon a base part, comprising a rock sleeve arranged to rotate about a generally horizontal axis extending adjacent and along the back of said seat part, a bearing on said base part adjacent one side of said seat part for a central portion of said rock tube, said rock sleeve projecting beyond said bearing and along an adjacent seating space, a second bearing for said base part adjacent the other side of said seat part, a pair of generally parallel crank arms intermediate said bearings and fast to said rock sleeve and projecting under and toward the front of said seat part, means pivotally connecting the forward ends of said crank arms to the front of said seat part, a metal torsion bar arranged coaxially in said rock sleeve and having one end fixed to the projecting extremity of said rock sleeve, and means anchoring the other end of said torsion bar to said base part.

14. A spring suspension as set forth in claim 13 wherein said anchoring means comprises an adjusting sleeve fixed to said other end of said torsion bar and journaled in said second bearing, an adjusting arm fixed to said adjusting sleeve, and means selectively positioning said adjusting arm in different angular positions.

15. A spring suspension as set forth in claim 13 wherein said anchoring means comprises an adjusting member fixed to said other end of said torsion bar, an adjusting arm fixed to said adjusting member, a nut pivotally mounted on said adjusting arm, a screw having a threaded portion in said nut and extending fore-and-aft, and means on said base preventing longitudinal movement of said screw.

16. A spring suspension for resiliently supporting a seat part upon a base part, comprising a first pair of spaced, generally parallel rock arms, means pivotally connecting corresponding ends of said first pair of rock arms to one of said parts to swing about a generally horizontal axis at one side of the seat suspension which axis is in fixed relation to said one of said parts, means pivotally connecting the opposite ends of said first pair of rock arms to the other of said parts to swing about an axis at the other side of the spring suspension generally parallel with said first mentioned axis, a second pair of generally parallel rock arms, means pivotally connecting corresponding ends of said second pair of rock arms to said one of said parts to swing about an axis at said other side of said spring suspension generally parallel with said first mentioned axis, which last mentioned axis is in fixed relation to said one of said parts, means pivotally connecting the opposite ends of said second pair of rock arms to swing about an axis at said one side of the said spring suspension generally parallel with said first mentioned axis, whereby said first and second rock arms are in criss-cross relation to one another, a torsion spring arranged concentric to one of said axes, means operatively connecting one end of said torsion spring to the ends of said rock arms at said one of said axes, and means anchoring the other end of said torsion spring on the adjacent part.

17. A spring suspension for resiliently supporting a seat part upon a base part, comprising a rock shaft journalled on one of said parts to swing about a generally horizontal axis at one side of said seat suspension which axis is in fixed relation to said one of said parts, a pair of spaced crank arms fixed at one end to said rock shaft and projecting toward the other side of said seat suspension, means pivotally connecting the opposite ends of said crank arms to the other of said parts to swing about an axis at the other side of the spring suspension generally parallel with said rock shaft, a pair of generally parallel rock arms, means pivotally connecting corresponding ends of said pair of rock arms to said one of said parts to swing about an axis at said other side of the spring suspension generally parallel with rock shaft, which last mentioned axis is in fixed relation to said one of said parts, means pivotally connecting the opposite ends of said rock arms to swing about an axis at said one side of the spring suspension generally parallel with said rock shaft, whereby said rock arms and crank arms are in criss-cross relation to one another, a torsion spring arranged concentric with said rock shaft, means connecting one end of said torsion spring to said rock shaft and means anchoring the other end of said torsion spring on said one of said parts.

References Cited in the file of this patent

UNITED STATES PATENTS

| | | |
|---|---|---|
| 1,357,743 | Tasman | Nov. 2, 1920 |
| 2,568,930 | Parsons | Sept. 25, 1951 |
| 2,607,611 | Allison | Aug. 19, 1952 |
| 2,691,406 | Hickman | Oct. 12, 1954 |
| 2,706,627 | Hickman | Apr. 19, 1955 |
| 2,718,257 | Lie | Sept. 20, 1955 |
| 2,760,553 | Lie | Aug. 28, 1956 |
| 2,784,767 | Soderberg | Mar. 12, 1957 |
| 2,848,956 | Deist | Aug. 26, 1958 |
| 2,889,868 | Seenberg | June 9, 1959 |
| 2,916,082 | Wilkinson et al. | Dec. 8, 1959 |

FOREIGN PATENTS

| | | |
|---|---|---|
| 598,458 | Great Britain | Feb. 18, 1948 |
| 612,475 | Great Britain | Nov. 12, 1948 |
| 1,126,873 | France | July 30, 1956 |